United States Patent
Endo et al.

(10) Patent No.: US 8,195,911 B2
(45) Date of Patent: Jun. 5, 2012

(54) NUMERICAL CONTROLLER CAPABLE OF DIVIDING AND COMBINING MEMORY AREAS TO STORE MACHINING PROGRAMS AND BINARY DATA

(75) Inventors: Takahiko Endo, Minamitsuru-gun (JP); Yasushi Takeuchi, Minamitsuru-gun (JP)

(73) Assignee: FANUC Ltd., Minamitsuru-gun, Yamanashi (JP)

( * ) Notice: Subject to any disclaimer, the term of this patent is extended or adjusted under 35 U.S.C. 154(b) by 127 days.

(21) Appl. No.: 12/852,777

(22) Filed: Aug. 9, 2010

(65) Prior Publication Data
US 2011/0093666 A1    Apr. 21, 2011

(30) Foreign Application Priority Data

Oct. 20, 2009   (JP) ................................. 2009-241636

(51) Int. Cl.
*G06F 13/14*   (2006.01)
(52) U.S. Cl. ................. 711/173; 711/154; 711/E12.001
(58) Field of Classification Search .................. 711/154, 711/173
See application file for complete search history.

(56) References Cited

U.S. PATENT DOCUMENTS

| | | | |
|---|---|---|---|
| 4,692,856 A | 9/1987 | Komiya | |
| 6,885,909 B2 | 4/2005 | Isohata | |
| 2010/0231157 A1* | 9/2010 | Haga et al. | 318/570 |

FOREIGN PATENT DOCUMENTS

| | | |
|---|---|---|
| JP | 58-164080 | 9/1983 |
| JP | 59-177604 | 10/1984 |
| JP | 60-132241 | 7/1985 |
| JP | 61-161514 | 7/1986 |
| JP | 63-019007 | 1/1988 |
| JP | 02-190906 | 7/1990 |
| JP | 3-116204 | 5/1991 |
| JP | 05-265525 | 10/1993 |
| JP | 8-166808 | 6/1996 |
| JP | 10-161729 | 6/1998 |
| JP | 11-202917 | 7/1999 |
| JP | 2003-303005 | 10/2003 |
| JP | 2004-139232 | 5/2004 |

* cited by examiner

*Primary Examiner* — Kenneth Lo
(74) *Attorney, Agent, or Firm* — Drinker Biddle & Reath LLP (57) ABSTRACT

A memory other than a non-volatile memory in a numerical controller is divided into a plurality of memory areas in response to a command from a computer connected to the numerical controller. Whether a machining program has been stored in each of the divided memory areas is decided before a machining program stored on a hard disk in the computer is transferred to the memory other than the non-volatile memory. The machining program stored on the hard disk is then written to an area for which it is determined that no machining program is stored.

40 Claims, 9 Drawing Sheets

MANAGEMENT TABLE

| AREA NAME | MEMORY AREA (ADDRESS) | PROGRAM NAME | STORED FLAG FA | DELETABLE FLAG FB | IN-OPERATION FLAG FC |
|---|---|---|---|---|---|
| 1 | 1000 | PR100 | 1 | 0 | 0 |
| 2 | 5000 | | | | |
| 3 | 10000 | PR500 | 1 | 1 | |
| ⋮ | ⋮ | ⋮ | ⋮ | ⋮ | ⋮ |
| X | 140000 | | 0 | 0 | 0 |

NUMERICAL CONTROLLER CAPABLE OF DIVIDING AND COMBINING MEMORY AREAS TO STORE MACHINING PROGRAMS AND BINARY DATA

RELATED APPLICATION DATA

This application claims priority under 35 U.S.C. §119 and/or §365 to Japanese Application No. 2009-241636 filed Oct. 20, 2009, the entire contents of which are incorporated herein by reference.

BACKGROUND OF THE INVENTION

1. Field of the Invention

The present invention relates to a numerical controller for controlling machine tools and industrial machines and, more particularly, to a numerical controller that can divide a memory in which to store machining programs or those in binary data format into memory areas and can combine divided memory areas.

2. Description of the Related Art

In a conventional well-known interpreter-type numerical controller, NC programs or machining programs in binary data format are stored in a memory in the numerical controller, and during an operation, the numerical controller performs analysis and preprocessing in a preprocessing part and executes the programs in an execution control part while reading the programs sequentially.

In many systems used for machining lines in factories, machining programs stored and managed in a personal computer are transferred to and stored in a memory in a numerical controller, and the machining programs stored in the memory are operated.

In a system often used when a standalone numerical controller, to which a personal computer or the like is not connected, is employed, machining programs stored and managed in a memory card or USB memory connected to the numerical controller or in a non-volatile memory in the numerical controller are transferred to and stored in another memory (such as a RAM) other than the non-volatile memory in the numerical controller, and the machining programs stored in the other memory are operated.

Each system described above is problematic in that when it is operated with conventional machining programs in such a way that after a first workpiece has been machined, a second workpiece is machined, the machining of the second workpiece must be awaited until a machining program for the second workpiece, which is stored and managed in the personal computer, in the memory card or USB card connected to the numerical controller, or in the volatile memory in the numerical controller, has been transferred to and stored in the other memory (such as a RAM) other than the non-volatile memory in the numerical controller. This problem can be solved by using a ring buffer in which an old program that has been operated is overwritten with a new machining program.

Figure 11:
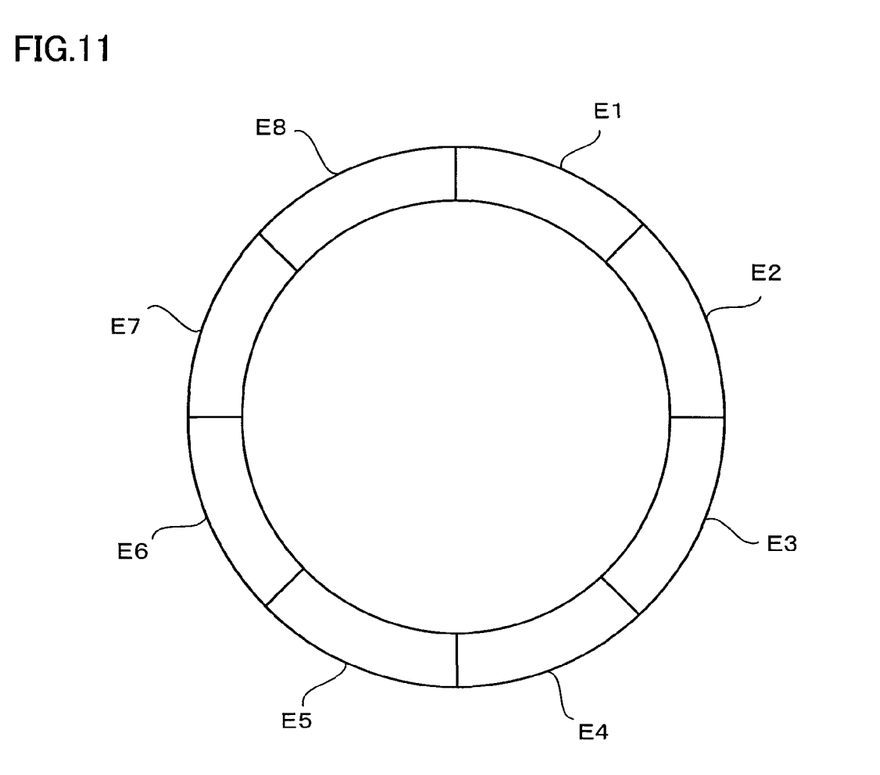
FIG. 11 illustrates a ring buffer.

FIG. 11 illustrates a ring buffer of this type.

The ring buffer in FIG. 11 is formed from eight storage elements E1 to E8. First data is stored in E1, and subsequent data is stored in E2, E3, . . . in that order. When data is stored in storage element E8, next data is stored in storage element E1 by an overwrite operation.

Besides the interpreter-type numerical controller described above, Japanese Patent Application Laid-Open Nos. 61-161514 and 10-161729 disclose a numerical controller having an operation function based on binary data, which reads binary data stored in a memory in succession during an operation to execute the read binary data in an execution control part. While reading programs for binary data (path tables), created as text files, in succession before an operation starts, the numerical controller performs analysis and preprocessing in a preprocessing part, carries out a conversion into binary data, which is executable by the execution control part, in a conversion part in the numerical controller, and stores the converted binary data in the memory. The numerical controllers are of the compiler type because programs are converted into object code, which is binary data, in advance and the object code is executed at an execution time.

A text file is a file in which text (in alphanumeric characters and numerals) used to code cutting procedures executed by application programs is written. A binary file, which is coded with numerical data such as binary numbers, is paired with a text file. NC programs are text files.

The above operation function based on binary data is disclosed in, for example, Japanese Patent Application Laid-Open Nos. 59-177604 and 2003-303005. A numerical controller having this operation function has a so-called path table operation function by which a path table, in which positions of control axes are set with respect to time or a spindle position, is converted into binary data, the converted binary data is stored, and the stored binary data is read in succession to drive each control axis.

In many systems used in machining lines in factories, programs for binary data, created as text files and then stored and managed in a personal computer, are transferred to a numerical controller, converted into binary data in a conversion part in the numerical controller, and stored in a memory, and the binary data stored in the memory is operated.

Conversely, in a system often used when a standalone numerical controller, to which a personal computer or the like is not connected, is employed, programs for binary data that are created as text files and stored and managed in a memory card or USB memory connected to the numerical controller or in a non-volatile memory in the numerical controller are converted into binary data by a conversion part in the numerical controller, the converted binary data is transferred to and stored in another memory other than the non-volatile memory in the numerical controller, and the binary data stored in the other memory is operated.

Each system described above is problematic in that when it is operated with conventional binary data in such a way that after a first workpiece has been machined, a second workpiece is machined, the machining of the second workpiece must be awaited until a program for binary data, which is created as a text file transferred from the personal computer to the numerical controller or as a text file stored and managed in the USB card or in the volatile memory in the numerical controller, has been converted into binary data in the numerical controller and stored in the other memory. This problem can be solved by using a ring buffer in which old binary data that has been executed is overwritten with new binary data.

Figure 10:
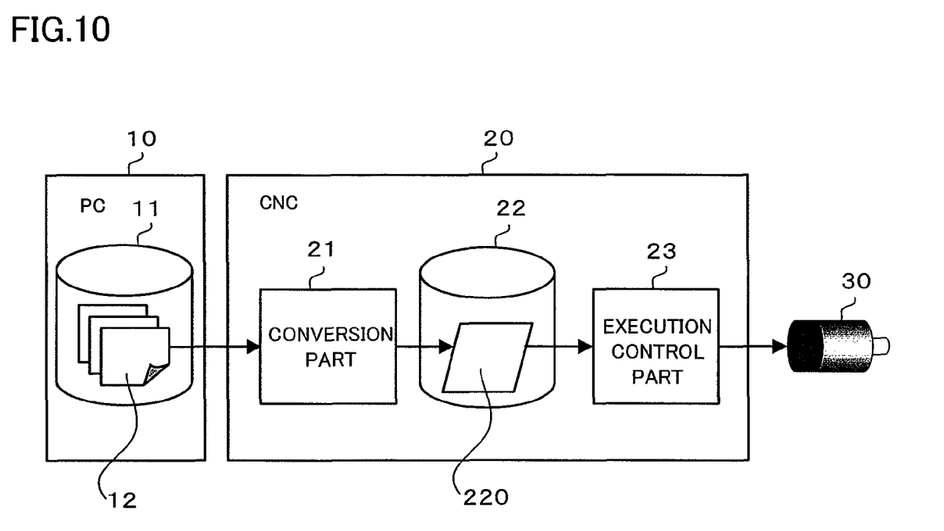
FIG. 10 illustrates a system that uses a conventional tabular data (a path table) for an operation.

FIG. 10 illustrates a system that uses conventional tabular data (referred to below as the path table) for an operation.

A personal computer 10 creates path tables 12 needed for a path table operation. The created path tables 12 are stored on a hard disk 11. The path tables 12 stored on the hard disk 11 are transferred to a numerical controller 20. In FIG. 10, the personal computer and numerical controller are respectively denoted PC and CNC.

Each path table 12 transferred to the numerical controller 20 is converted by a conversion part 21 into binary data and stored in a memory 22 as binary data 220. While reading the binary data 220 stored in the memory 22 in succession, the numerical controller 20 executes the read binary data in an execution control part 23.

The above system is problematic in that when it is operated with conventional path tables in such a way that after a first workpiece has been machined, a second workpiece is machined, the machining of the second workpiece must be awaited until a path table for the second workpiece, which is stored and managed in the personal computer 10, has been transferred to and stored in the memory 22 in the numerical controller 20. This problem can be solved by using a ring buffer in which binary data in an old path table that has been operated is overwritten with binary data in a new path table.

A system using the ring buffer to overwrite machining programs also poses a problem in that if binary data in a path table is used a plurality of times for, for example, a skip operation, a retractive operation, a retrogradation, and a subprogram call, then a ring buffer which is designed so as not to leave any binary data in the path table that has been executed cannot be used.

SUMMARY OF THE INVENTION

It is an object of the present invention to provide a numerical controller that has a plurality of memory areas for storing machining programs or binary data and that can shorten a wait time required to prepare a machining program or binary data in each of the memory areas.

Another object of the present invention is to provide a numerical controller that can shorten wait times required to prepare many small-size machining programs or binary data items by further dividing an existing memory area into a plurality of areas.

Yet another object of the present invention is to provide a numerical controller that can combine a plurality of memory areas to store and execute a large-size machining program or a large size of binary data and can divide the combined memory area again upon completion of the operation.

Still another object of the present invention is to provide, while executing a machining program or binary data in a skip operation, a retractive operation, a retrogradation, or a subprogram call, a numerical controller that can switch to and execute a machining program or binary data in another memory area.

A numerical controller in a first embodiment of the present invention has an operation function that transfers a machining program stored in a storage unit in a computer connected to the numerical controller, an external storage unit connected to the numerical controller, or a non-volatile memory in the numerical controller to another memory other than the non-volatile memory in the numerical controller, and stores the transferred machining program therein, the operation function being based on the machining program; the numerical controller has means for dividing an area of the other memory into a plurality of memory areas in response to a command from the computer or a process in the numerical controller, deciding means for deciding, when the machining program is transferred to and stored in the other memory, whether a machining program has been stored in each of the plurality of memory areas, and writing means for writing the machining program to a memory area for which the deciding means decides that no machining program is stored.

A numerical controller in a second embodiment of the present invention has an operation function that divides a non-volatile memory in the numerical controller into a plurality of memory areas, transfers a machining program stored in any one of the divided memory areas to another memory in the non-volatile memory, and stores the transferred machining program therein, the operation function being based on the machining program; the numerical controller has means for dividing an area in the non-volatile memory, to which a machining program is transferred and in which the transferred machining program is stored, into a plurality of areas in response to a command from a computer connected to the numerical controller or a process in the numerical controller, deciding means for deciding, when the machining program is transferred to and stored in one of the divided areas, whether a machining program has been stored in each of the plurality of areas, and writing means for writing the machining program to an area for which the deciding means decides that no machining program is stored.

A numerical controller in a third embodiment of the present invention has an operation function that converts a machining program for binary data, created as a text file and stored in a storage unit in a computer connected to the numerical controller, an external storage unit connected to the numerical controller, or a non-volatile memory in the numerical controller, into binary data by performing analysis and preprocessing on the machine program while reading the machine program in succession, transfers the converted binary data to another memory other than the non-volatile memory in the numerical controller, stores the transferred binary data therein, and executes the stored binary data during an operation while reading the binary data in succession, the operation function being based on the binary data; the numerical controller has means for dividing the other memory into a plurality of memory areas in response to a command from the computer or a process in the numerical controller, deciding means for deciding, when the binary data is transferred to and stored in the other memory, whether a machining program has been stored in each of the plurality of areas, and writing means for writing the binary data to an area for which the deciding means decides that no machining program is stored.

A numerical controller in a fourth embodiment of the present invention has an operation function that divides a non-volatile memory in the numerical controller into a plurality of memory areas, converts a machining program for binary data, stored in any one of the divided memory areas, into binary data by performing analysis and preprocessing on the machine program while reading the machine program in succession, transfers the binary data to another memory area in the non-volatile memory in the numerical controller, stores the transferred binary data therein, and executes the stored binary data during an operation while reading the binary data in succession, the operation function being based on the binary data; the numerical controller has means for dividing an area, to which the binary data in the non-volatile memory is transferred and in which the transferred binary data is stored, into a plurality of areas in response to a command from a computer connected to the numerical controller or a process in the numerical controller, deciding means for deciding, when the binary data is transferred to and stored in one of the divided areas, whether binary data has been stored in each of the plurality of areas, and writing means for writing the binary data to an area for which the deciding means decides that no binary data is stored.

The numerical controllers in the first to fourth embodiments of the present invention can have the following aspects.

The numerical controller further has deciding means for deciding, when it is decided that a machining program or binary data is stored in each of the plurality of areas, in a decision as to whether a machining program or binary data is stored in each of the plurality of areas, whether the machining program or binary data stored in the other memory or each of the plurality of areas in the non-volatile memory is being operated as well as writing means for deleting any of machining programs or binary data for which it is decided by the deciding means that the machining programs or binary data is not being operated, and writing a new machining program or new binary data to the area from which the machining program or binary data has been deleted.

The numerical controller further has selection means for selecting an area, from among the plurality of areas, in which the machining program or binary data should be stored in response to a command from inside or outside of the numerical controller when the machining program or binary data is stored.

The numerical controller further has selection means for selecting an area, from the plurality of areas, from which to delete the machining program or binary data in response to a command from inside or outside of the numerical controller when the machining program or binary data is deleted.

The numerical controller further has selection means for selecting an area, from among the plurality of areas, that includes the machining program or binary data to be operated in response to a command from inside or outside of the numerical controller when the machining program or binary data is operated.

The numerical controller further has means for further dividing at least one of the divided areas into a plurality of areas for storing machining programs or binary data items which are smaller in size than that of the divided areas or larger in number than that of the divided areas, deciding means for deciding, when the machining program or binary data is transferred to and stored in the memory, whether a machining program or binary data has been stored in each of the plurality of areas; and writing means for writing the machining program or the binary data to an area for which the deciding means decides that no machining program or binary data is stored.

The numerical controller further has reserving means for reserving areas again in which a machining program or binary data larger in size than that of each of the divided areas is stored by combining the divided areas, deciding means for deciding, when the machining program or binary data is transferred to and stored in the memory, whether a machining program or binary data has been stored in each of the areas reserved by combining the divided areas, and writing means for writing the machining program or binary data to an area for which the deciding means decides that no machining program or binary data is stored. The numerical controller further can have means for storing, when a machining program or binary data used to machine a single workpiece is too large to be stored in one of the areas combined by the reserving means, the machining program or binary program in two or more of the areas combined by the reserving means, and means for storing data, in the numerical controller, for linking a divided area to a next divided area. The data for linking a divided area to a next divided area may be designed to be combined with machine programs or binary data for machining a single workpiece, stored in two or more of the divided areas, for execution. The numerical controller may further have selection means for selecting the number of areas by which the other memory or non-volatile memory is divided and the size of each divided area, in response to a command from inside or outside of the numerical controller.

The numerical controller further has selection means for selecting, from among the plurality of reserved areas, areas to be combined, in response to a command from inside or outside of the numerical controller.

The present invention can provide a numerical controller that has a plurality of memory areas for storing machining programs or binary data and that can shorten a wait time required to prepare a machining program binary data in each of the memory areas.

The present invention can also provide a numerical controller that can shorten wait times required to prepare many small-size machining programs or binary data items by further dividing an existing memory area into a plurality of areas.

The present invention can also provide a numerical controller that can combine a plurality of memory areas to store a large-size machining program or a large size of binary data to execute the program or binary data and divide the combined area again upon completion of the operation.

The present invention can also provide, while operating a machining program or binary data in a skip operation, a retractive operation, a retrogradation, or a sub-program call, a numerical controller that can switch to and execute a machining program or binary data in another memory area.

BRIEF DESCRIPTION OF THE DRAWINGS

The purposes and advantages of the present invention, including those described above, will be clarified by referring to the attached drawings in combination with the description of the embodiments described below. Of these drawings.

DETAILED DESCRIPTION OF THE PREFERRED EMBODIMENTS

Figure 1:
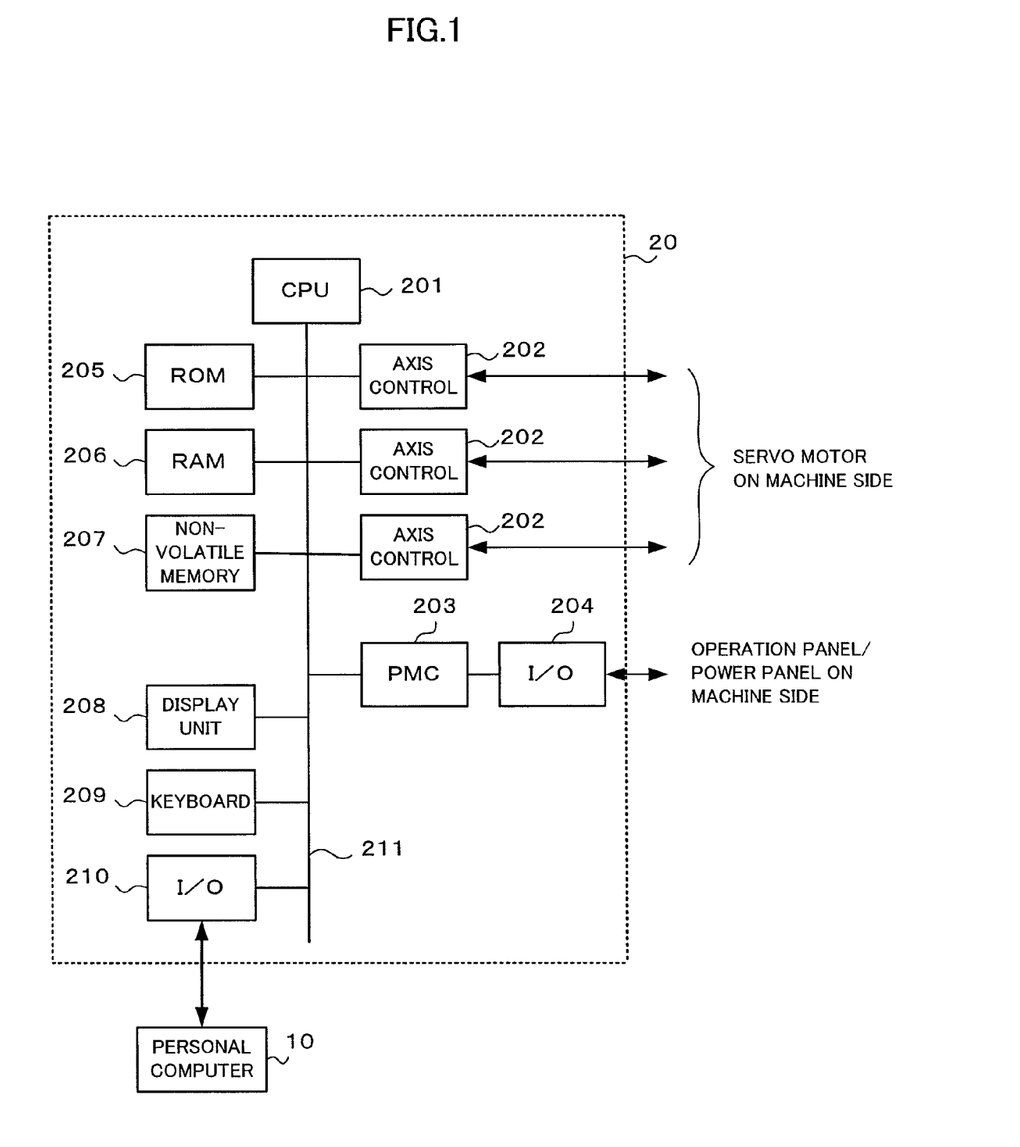
FIG. 1 is a block diagram illustrating essential components of a numerical controller according to the present invention.

FIG. 1 is a block diagram illustrating essential components of a numerical controller according to the present invention.

A personal computer 10 is connected to the numerical controller 20. The numerical controller 20 includes a processor (CPU) 201, a ROM 205 in which programs for controlling the numerical controller 20 overall are stored, a RAM 206, a rewritable non-volatile memory 207 in which parameters, offset data, and the like are stored, a display unit 208, a keyboard 209, axis control circuits 202 for individual axes, a PMC 203 and an I/O unit 204 that execute a predetermined sequence and externally send and receive data to and from external units (such as machine-side power panel and operation panel), and an I/O unit 210 that sends and receives data to and from the personal computer 10 (as an external I/O unit); these components are mutually connected with a bus 211.

The numerical controller 20 has a plurality of memory areas in a memory constituted by the RAM 206 or battery-backed non-volatile memory 207 disposed in the numerical controller 20, in each of which a machining program and binary data resulting from conversion of a path table are stored. When the machining program or binary data in each memory area is executed, a wait time required to prepare a machining program and path table to machine another workpiece can be reduced.

Figure 2:
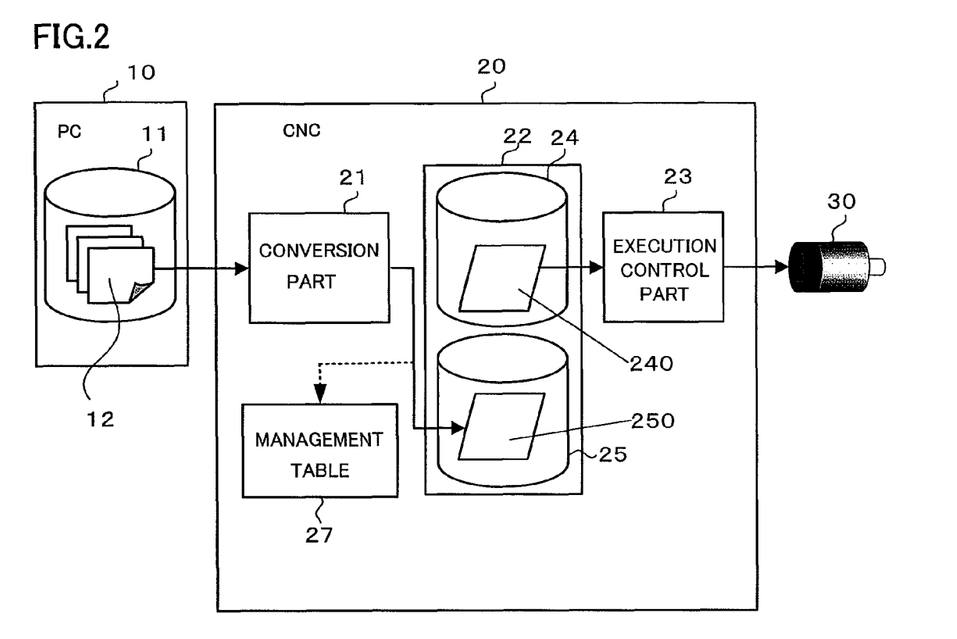
FIG. 2 illustrates an embodiment in which two memory areas (a first memory area and a second memory area) are provided in the numerical controller, wherein the binary data stored in the first memory area is used for an operation.

FIG. 2 illustrates an example in which two memory areas (a first memory area 24 and a second memory area 25) are provided in the numerical controller, wherein binary data stored in the first memory area 24 is used for an operation.

A path table 12 created in the personal computer 10 is transferred to the numerical controller 20. The machining programs and path table 12 are stored on a hard disk 11 in the personal computer 10. A flash ROM or another large-capacity non-volatile memory may be used, instead of the hard disk 11.

The path table 12 transferred from the personal computer 10 is converted into binary data 250 by a conversion part 21 while binary data 240 stored in the first memory area 24 of the memory 22 in the numerical controller 20 is being executed; the binary data 250 that has been converted is then stored in the second memory area 25. Upon completion of the execution of the binary data 240 in the first memory area 24, the binary data stored in the second memory area 25 is executed by an execution control part 23 while being read in succession.

Figure 6:
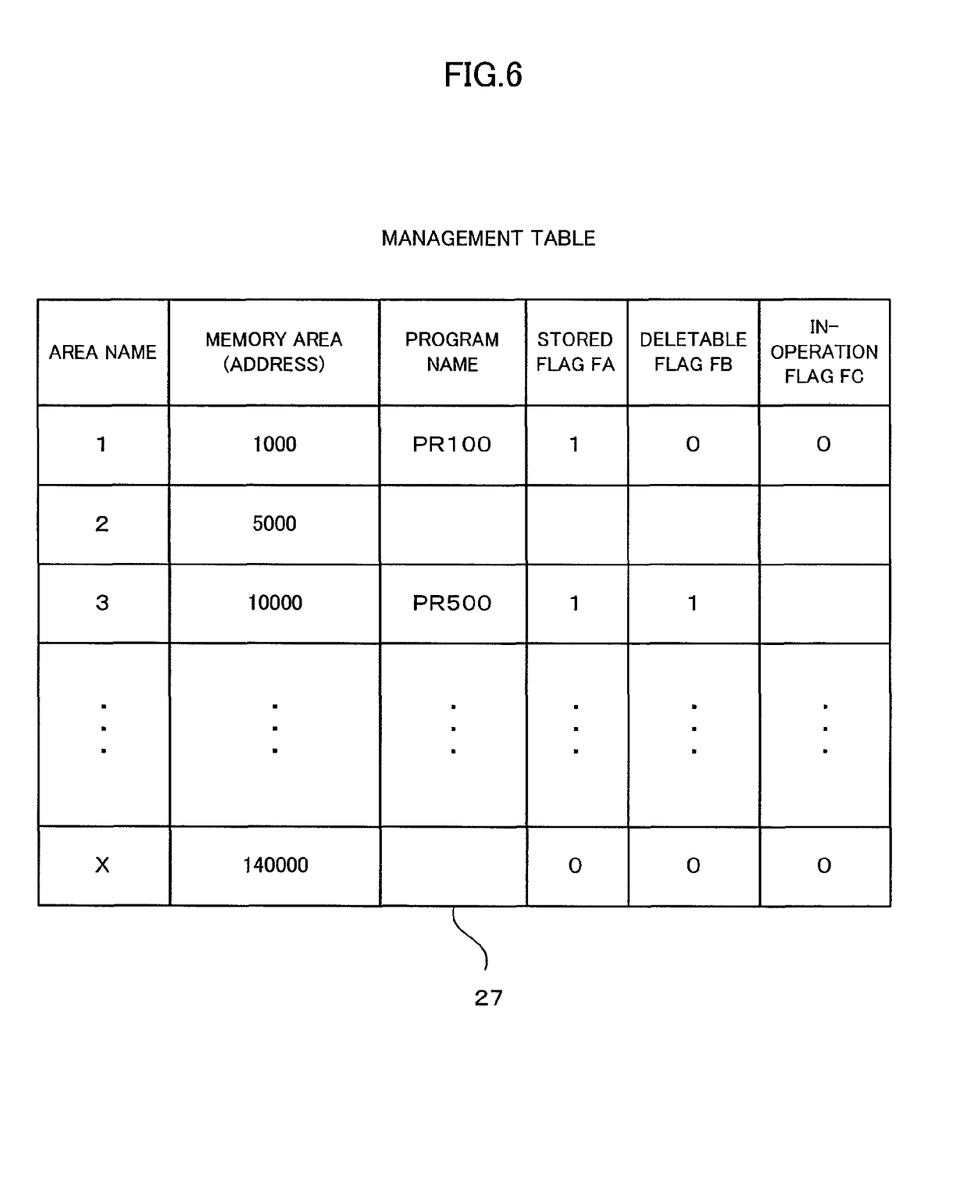
FIG. 6 shows a management table.

Information about memory areas obtained by dividing the RAM 206 or non-volatile memory 207 or by combining divided memory areas is stored in a management table 27 shown in FIG. 6 as internal commands for the personal computer 10 or numerical controller 20. The management table 27 manages the locations of the storage areas in which the path tables that have been converted into binary data by the conversion part 21 are stored.

Data in the management table 27 can be rewritten in response to a command from the personal computer 10 or an internal command from the numerical controller 20. The number of memory areas obtained by dividing the memory and the size of each divided memory area may be selectively set.

The management table 27 is stored in, for example, the RAM 206 in FIG. 1. The management table 27 includes the name, addresses (first address and end address), and size of each memory area as well as the name of a program stored therein. The management table 27 also includes a stored flag FA used to decide whether a machining program or binary data has been stored in the relevant memory area, a deletable flag FB used to decide whether the machining program or binary data stored in the memory area can be deleted, and an in-operation flag FC used to decide whether the machining program or binary data stored in the memory area is being operated.

When the stored flag FA is set to 1, it indicates that the machining program or binary data has been stored; when the flag is set to 0, it indicates that the machining program or binary data has not been stored. When the deletable flag FB is set to 1, it indicates that the machining program or binary data in the memory area may be deleted; when the flag is set to 0, it indicates that the machining program or binary data must not be deleted. The deletable flag FB may be rewritten in response to a command from the personal computer 10 or an internal command from the numerical controller 20. Accordingly, whether to delete the machining program or binary data stored in the memory area can be selected.

When the in-operation flag FC is set to 1, it indicates that the machining program or binary data stored in the memory area is being operated; when the flag is set to 0, it indicates that the machining program or binary data is not being operated.

When the memory is divided into memory areas or divided memory areas are combined, the addresses of memory areas corresponding to memory area names to be stored in the management table 27 are rewritten. Alternatively, non-consecutive areas may be combined in view of the end address of each memory area. The memory may be divided so as to match the size of the machining program or binary data.

If a machining program or binary data larger than a divided memory area is stored, it is also possible to obtain a plurality of memory areas on the basis of the size information about each memory area stored in the management table 27 and combine the plurality of memory areas obtained into one memory area, for example. When a plurality of memory areas are combined into one memory area in this way, the address information about these memory areas stored in the management table 27 is used. The memory areas to be combined to reserve one memory area can be selected in response to a command from the personal computer 10 or an internal command from the numerical controller 20. In addition to divided memory areas, preset memory areas may be reserved.

If one machining program or binary data item is too large to be stored in one memory area, the machining program or binary data may be divided on the basis of memory area size information so that the machining program or binary data matches the sizes of memory areas, and each divided part may be stored in a memory area with a size that the divided part matches. The divided parts constituting the one machining program or one binary data item, which are stored in a plurality of memory areas, can be linked by using data stored in the management table 27 to operate the machining program or binary data. The management table 27 has data that indicates the locations of the memory areas in which the divided parts constituting one machining program or one binary data item are stored.

The numerical controller 20 selects a memory area in which a machining program or binary data are stored according to the stored flag FA. A new machining program or new binary data is stored in a memory area for which the stored flag FA is set to 0. The numerical controller 20 can decide whether to delete a machining program or binary data according to the deletable flag FB. The numerical controller 20 can also identify a machining program or binary data that is being executed according to the in-operation flag FC. Machining programs or binary data that is not in execution can be deleted. A memory area in which to store or from which to delete a machining program or binary data may be selected in response to command from the outside of the numerical controller 20 (a command from the personal computer 10, for example) or an internal command from the numerical controller 20.

Figure 3:
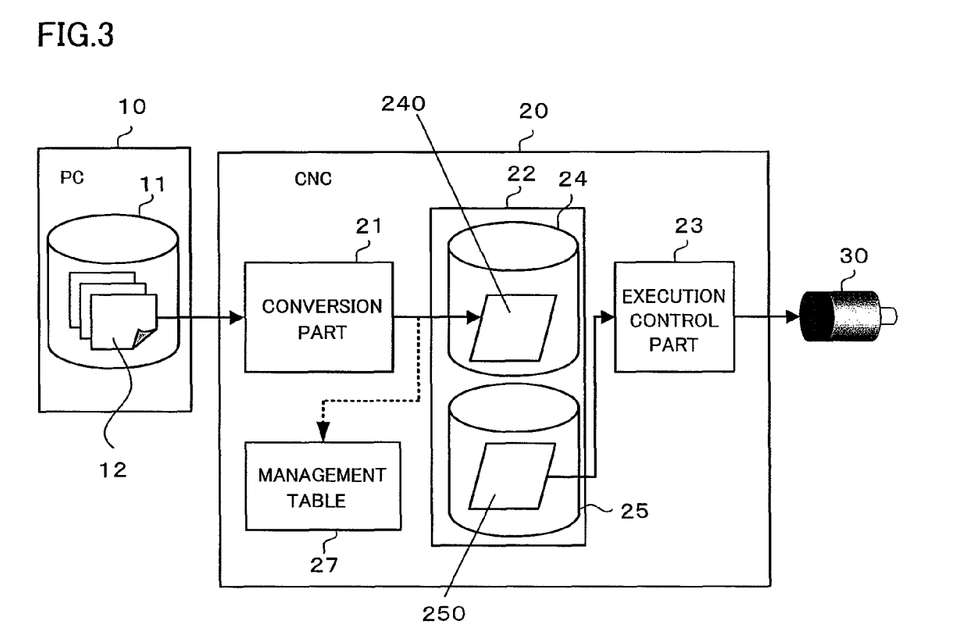
FIG. 3 illustrates an embodiment in which the two memory areas (the first memory area and the second memory area) are provided in the numerical controller, wherein the binary data stored in the second memory area is used for an operation.

FIG. 3 illustrates an embodiment in which the two memory areas (the first memory area and the second memory area) are provided in the numerical controller, wherein an operation is performed by using binary data stored in the second memory area.

As described with reference to FIG. 2, the binary data 240 stored in the first memory area 24 is first executed, and then the binary data 250 stored in the second memory area 25 is executed. During the execution of the binary data 250, the path table transferred from the personal computer 10 is converted into the binary data 240 in the conversion part 21 and stored in the first memory area 24.

Figure 4:
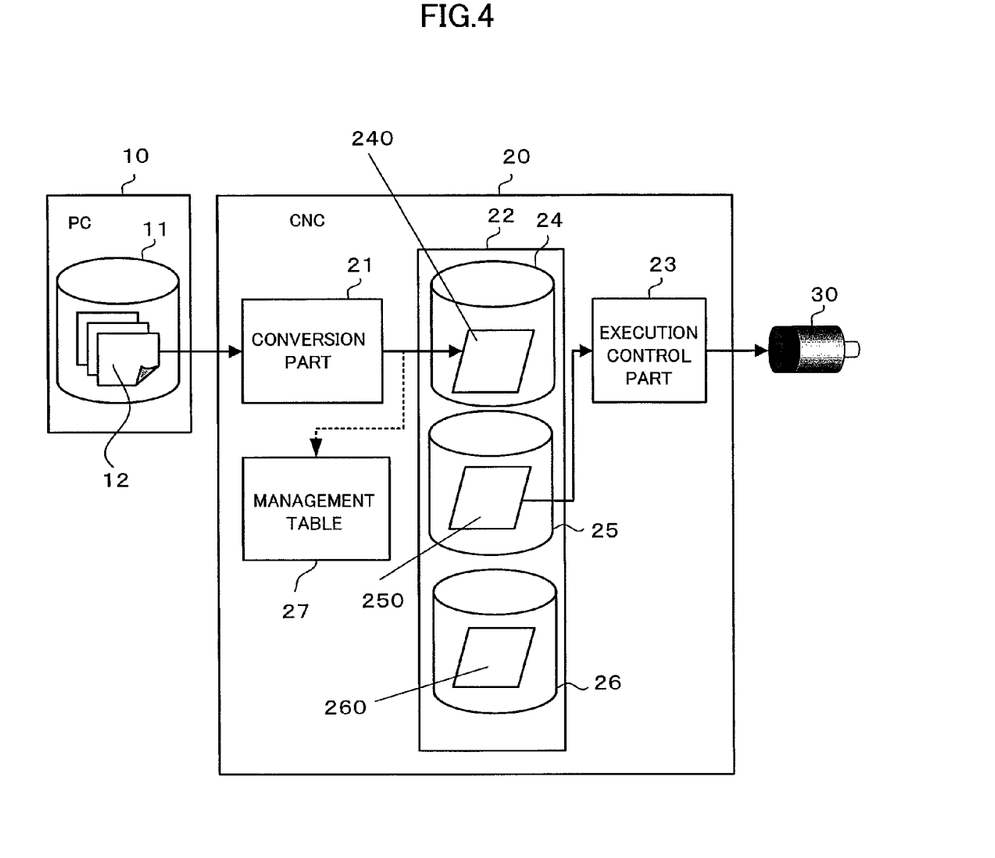
FIG. 4 illustrates another embodiment in which three memory areas (a first memory area, a second memory area, and a third memory area) are provided in the numerical controller, wherein the binary data stored in the second memory areas is used for an operation.

FIG. 4 illustrates another embodiment in which three memory areas (a first memory area, a second memory area, and a third memory area) are provided in the numerical controller, wherein binary data stored in the second memory areas is used for an operation.

As shown in FIGS. 2 to 4, the number of memory areas to be provided in the numerical controller 20 can be set as necessary. The number of memories to be provided can be determined from a command issued from the personal computer 10 or numerical controller 20. When the memory is divided into some memory areas as necessary in this way, although the capacity (size) of a single memory area is small, a wait time required to prepare many machining programs or many binary data items based on path tables can be shortened.

Since the capacity (size) of each memory area obtained by dividing the memory into a plurality of parts is small, when a large machining program or large binary data based on a path table is executed, the plurality of divided memory areas are combined. Then, the large machining program or the large binary data based on the path table can be stored in the combined memory area and executed. Upon completion of the execution, the combined memory area can be divided again.

Next, steps in a flowchart indicating an algorithm of processing in the embodiment in which two memory areas are provided in the numerical controller will be described with reference to FIG. 5.

[Step SA1] Whether there is a dividing command to divide a memory into a plurality of memory areas is decided. If there is such a dividing command, the processing proceeds to step SA2. If not, the processing proceeds to step SA3. The dividing command is issued from the personal computer connected to the numerical controller or from the numerical controller.

[Step SA2] The memory is divided according to the number of divisions and a size that are commanded by the personal computer or numerical controller. The memory to be divided is the rewritable RAM or non-volatile memory disposed in the numerical controller.

[Step SA3] Whether there is a combining command to combine divided memory areas is decided. If there is such a combining command, the processing proceeds to step SA4. If not, the processing proceeds to step SA5. The combining command is issued from the personal computer connected to the numerical controller or from the numerical controller.

[Step SA4] Memory areas commanded by the personal computer or numerical controller are combined.

[Step SA5] Tabular data (path table) transferred from the personal computer is read.

[Step SA6] The tabular data (path table) is converted into binary data.

[Step SA7] Whether to store the binary data in the first memory areas is decided. If the binary data is stored therein, the processing proceeds to step SA8. If not, the processing proceeds to step SA9.

[Step SA8] The binary data is stored in the first memory area.

[Step SA9] Whether to store the binary data in the second memory areas is decided. If the binary data is stored therein, the processing proceeds to step SA10. If not, the processing proceeds to step SA11.

[Step SA10] The binary data is stored in the second memory area.

[Step SA11] Whether to delete the binary data in the first memory areas is decided. If the binary data is deleted, the processing proceeds to step SA12. If not, the processing proceeds to step SA13.

[Step SA12] The binary data in the first memory area is deleted.

[Step SA13] Whether to delete the binary data in the second memory areas is decided. If the binary data is deleted, the processing proceeds to step SA14. If not, the processing proceeds to step SA15.

[Step SA14] The binary data in the second memory area is deleted.

[Step SA15] Whether to execute the binary data in the first memory areas is decided. If the binary data is executed, the processing proceeds to step SA16. If not, the processing proceeds to step SA17.

[Step SA16] The binary data in the first memory area is executed.

[Step SA17] Whether to execute the binary data in the second memory areas is decided. If the binary data is executed, the processing proceeds to step SA18. If not, the processing proceeds to step SA19.

[Step SA18] The binary data in the second memory area is executed.

[Step SA19] Whether there is a path table to be transferred from the personal computer is decided. If there is such a path table, the processing returns to step SA1. If not, the processing is terminated.

Figure 7:
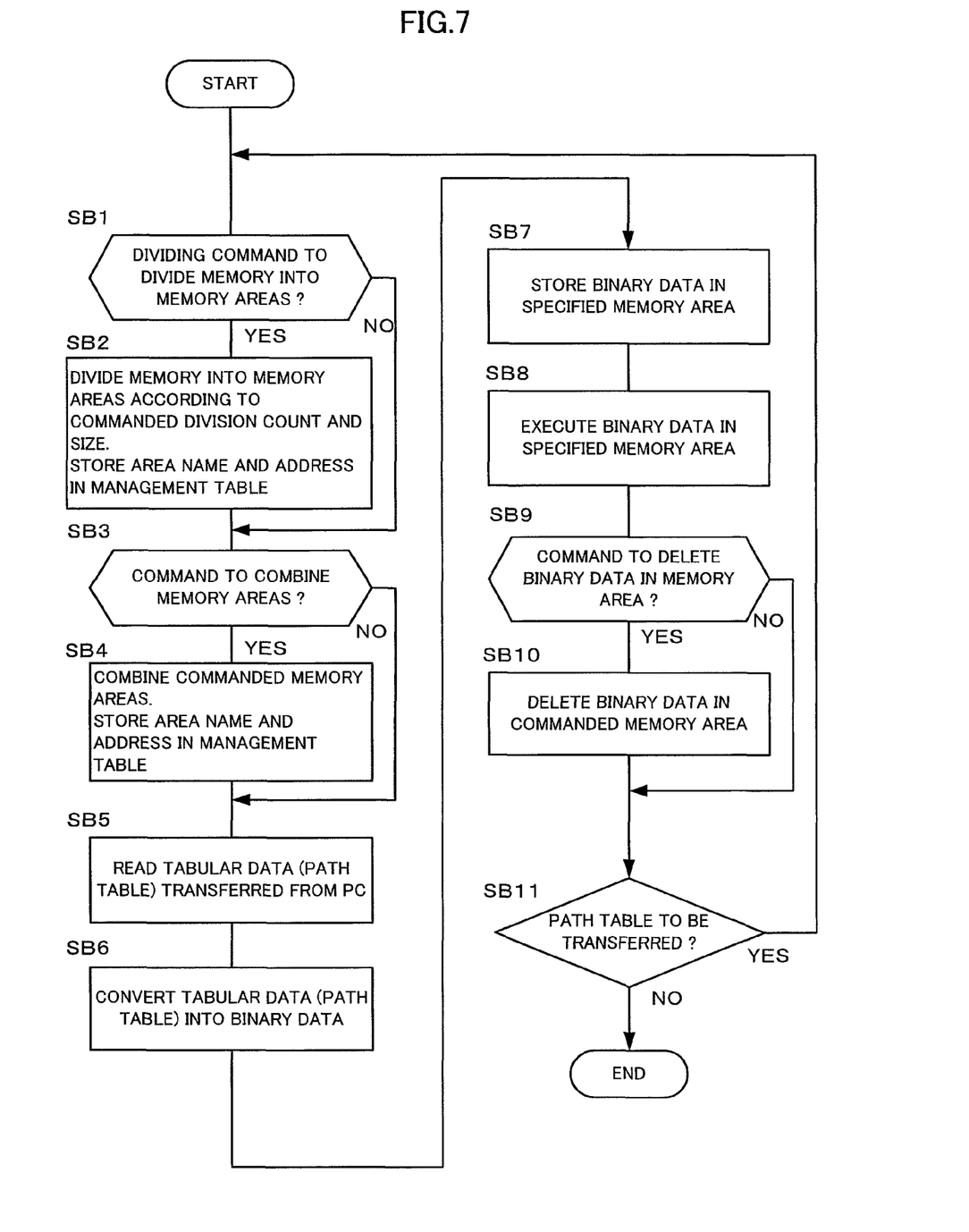
FIG. 7 illustrates an algorithm of processing to store binary data in memory areas.

FIG. 7 illustrates a flowchart of an algorithm of processing to store binary data in memory areas. The flowchart is more general than the flowchart shown in FIG. 5.

[Step SB1] Whether there is a dividing command to divide a memory into a plurality of memory areas is decided. If there is such a dividing command, the processing proceeds to step SB2. If not, the processing proceeds to step SB3. The dividing command is issued from the personal computer connected to the numerical controller or from the numerical controller.

[Step SB2] The memory is divided according to the number of divisions and the size that are commanded by the dividing command, and the area names and addresses of the divided memory areas are stored in the management table.

[Step SB3] Whether there is a combining command to combine divided memory areas is decided. If there is such a combining command, the processing proceeds to step SB4. If not, the processing proceeds to step SB5.

[Step SB4] Memory areas commanded by the personal computer or numerical controller are combined, and the area name and address of the combined memory area are stored in the management table.

[Step SB5] Tabular data (path table) transferred from the personal computer is read.

[Step SB6] The tabular data (path table) is converted into binary data.

[Step SB7] The converted binary data is stored in a specified memory area. The specified memory area is a free memory area that is sequentially selected or a memory area optimum for the size of the binary data. This optimum memory area is selected according to size information about the memory areas stored in the management table in advance.

[Step SB8] The binary data in a memory area specified by a command from the personal computer or an internal command from the numerical controller is executed.

[Step SB9] Whether there is a deleting command to delete the binary data in a specified memory area is decided. If there is such a deleting command, the processing proceeds to step SB10. If not, the processing proceeds to step SB11.

[Step SB10] The binary data in the specified memory area is deleted.

[Step SB11] Whether there is a path table to be transferred is decided. If there is such a path table, the processing returns to step SB1. If not, the processing is terminated.

Figure 8:
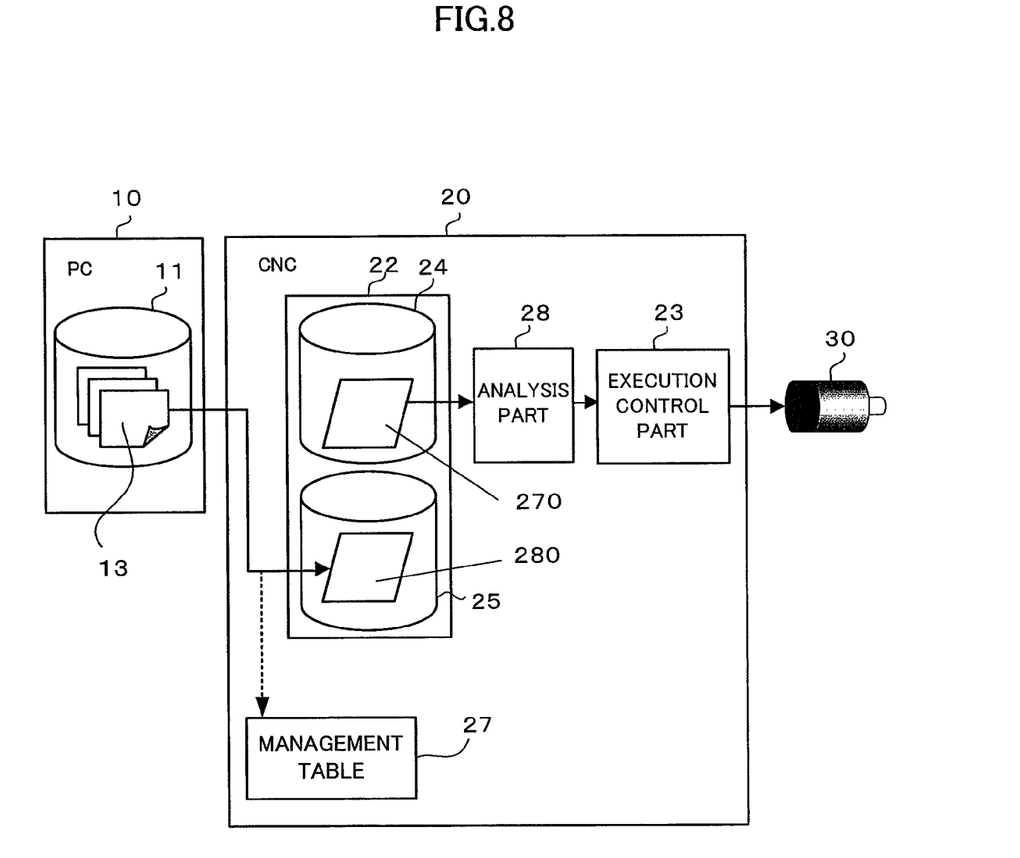
FIG. 8 illustrates an embodiment in which two memory areas are provided in the numerical controller, wherein a machining program stored in the first memory area is used for machining.

FIG. 8 illustrates an embodiment in which two memory areas are provided in the numerical controller, wherein a machining program stored in the first memory area is used for machining.

A machining program 13 stored on the hard disk 11 in the personal computer 10 is transferred to the numerical controller 20. The numerical controller 20 then stores the machining program 13, which has been transferred, in the memory 22. In FIG. 8, a machining program 270 stored in the first memory area 24 is analyzed in an analysis part 28 and the driving of a servo motor 30 is controlled by the execution control part 23. A second machining program 280 is stored in the second memory area 25.

Figure 9:
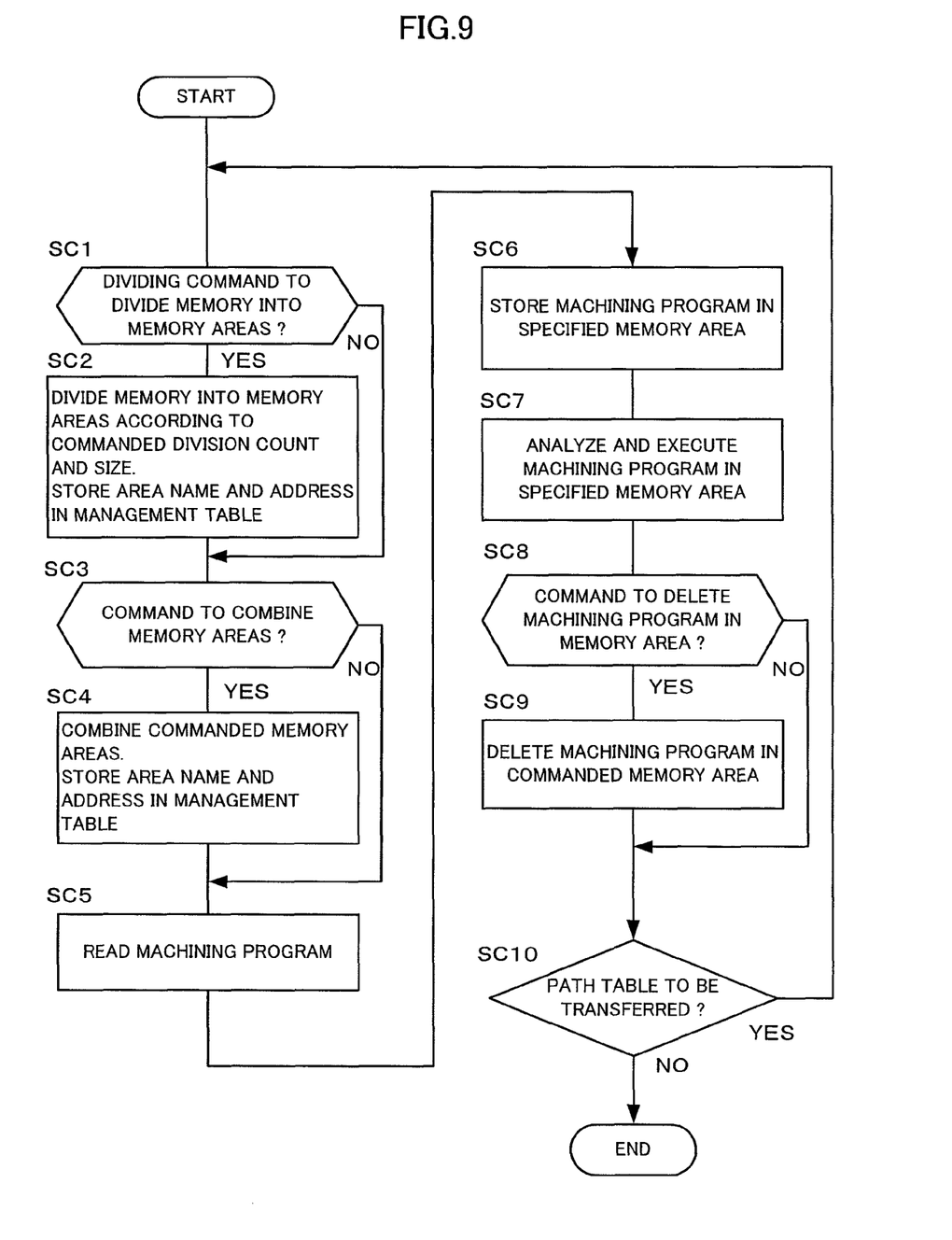
FIG. 9 illustrates an algorithm of processing to store a machining program in memory areas.

FIG. 9 illustrates steps in a flowchart of an algorithm of processing to store a machining program in memory areas.

[Step SC1] Whether there is a dividing command to divide a memory into a plurality of memory areas is decided. If there is such a dividing command, the processing proceeds to step SC2. If not, the processing proceeds to step SC3. The dividing command is issued from the personal computer connected to the numerical controller or from the numerical controller.

[Step SC2] The memory is divided according to the commanded number of divisions and the commanded size, and the area names and addresses of the divided memory areas are stored in the management table.

[Step SC3] Whether there is a combining command to combine divided memory areas is decided. If there is such a combining command, the processing proceeds to step SC4. If not, the processing proceeds to step SC5.

[Step SC4] Specified memory areas commanded are combined, and the area name and address of the combined memory area are stored in the management table.

[Step SC5] A machining program transferred from the personal computer is read.

[Step SC6] The read machining program is stored in a specified memory area. The specified memory area is, for example, a free memory area that is sequentially selected or a memory area optimum for the size of the machining program. This optimum memory area is selected according to size information about the memory areas stored in the management table in advance.

[Step SC7] The machining program in the specified memory area is analyzed and executed.

[Step SC8] Whether there is a deleting command to delete the machining program in a specified memory area is decided. If there is such a deleting command, the processing proceeds to step SC9. If not, the processing proceeds to step SC10.

[Step SC9] The machining program in the specified memory area is deleted.

[Step SC10] Whether there is a machining program to be transferred is decided. If there is such a machining program, the processing returns to step SC1. If not, the processing is terminated. The machining programs are transferred from the personal computer, etc.

Figure 5:
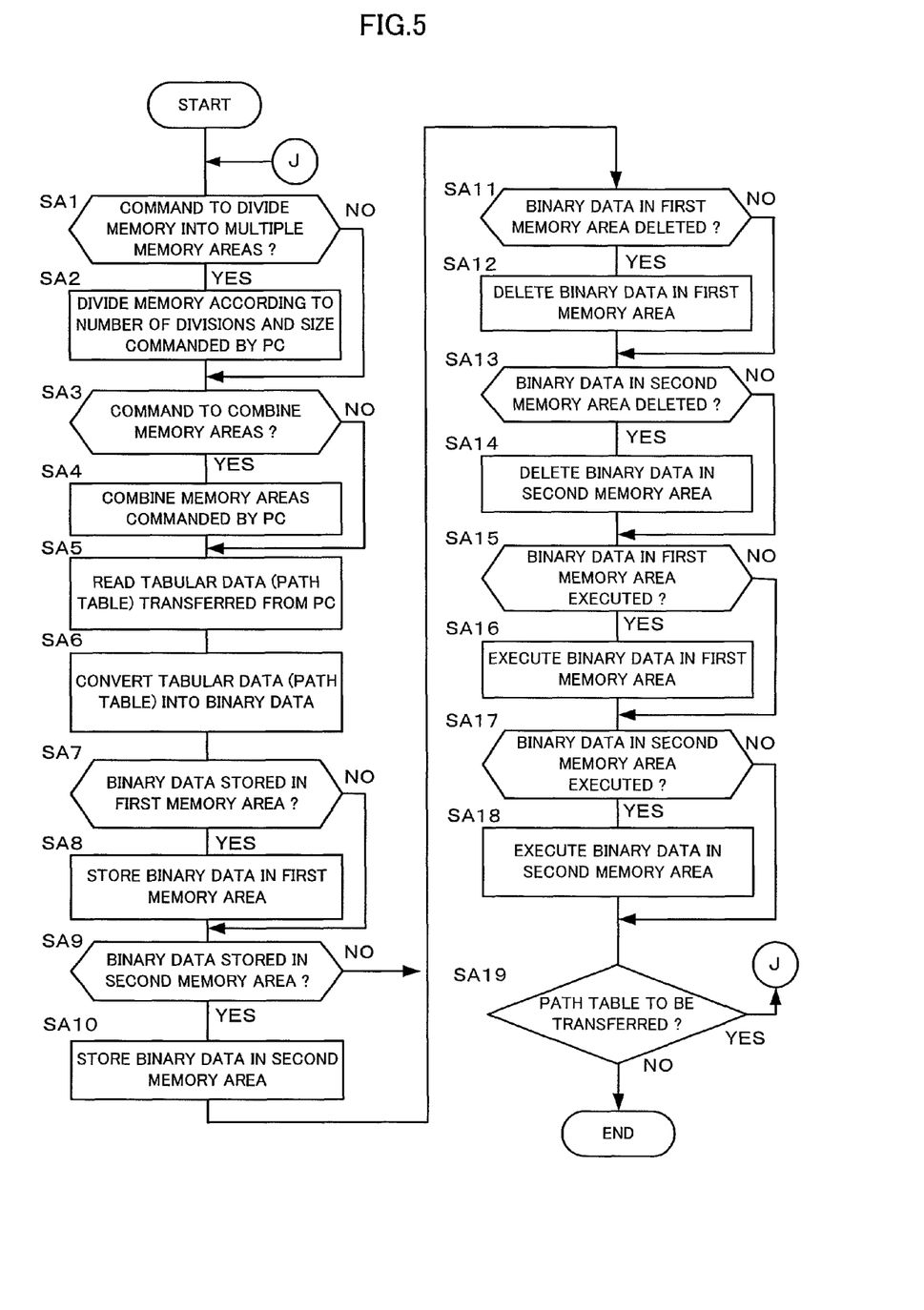
FIG. 5 illustrates an algorithm of processing in the embodiment in which two memory areas are provided in the numerical controller.

In FIGS. 5, 7 and 9, a plurality of machining programs or binary data items are stored in memory areas, after which a particular machining program is executed or a particular path table is operated. In the present invention, a management table is used to manage correspondence between memory areas and machining programs or binary data stored therein, so the processor (CPU) 201 can perform the reading of a machining program, the reading of a path table, creation of binary data from a path table, and execution of a machining program or binary data concurrently in a time-division manner.

The invention claimed is:

1. A numerical controller having an operation function that transfers a machining program stored in a storage unit in a computer connected to the numerical controller, an external storage unit connected to the numerical controller, or a non-volatile memory in the numerical controller to another memory other than the non-volatile memory in the numerical controller, and stores the transferred machining program therein, the operation function being based on the machining program, the numerical controller comprising:

means for dividing an area of the other memory into a plurality of memory areas in response to a command from the computer or a process in the numerical controller;

means for further dividing at least one of the divided areas into a plurality of areas for storing machining programs which are smaller in size than that of the divided areas or larger in number than that of the divided areas;

deciding means for deciding, when the machining program is transferred to and stored in the other memory, whether a machining program has been stored in each of the plurality of memory areas; and writing means for writing the machining program to a memory area for which the deciding means decides that no machining program is stored.

2. The numerical controller according to claim 1, further comprising:

deciding means for deciding, when it is decided that a machining program or binary data is stored in each of the plurality of areas in a decision as to whether a machining program or binary data is stored in each of the plurality of areas, whether the machining program or binary data stored in the other memory or each of the plurality of areas in the non-volatile memory is being executed; and writing means for deleting any of machining programs or binary data for which it is decided by the deciding means that the machining programs or binary data is not being executed, and writing a new machining program or new binary data to the area from which the machining program or binary data has been deleted.

3. The numerical controller according to claim 1, further comprising a selection means for selecting an area, from among the plurality of areas, in which the machining program or binary data should be stored in response to a command from inside or outside of the numerical controller when the machining program or binary data is stored.

4. The numerical controller according to claim 1, further comprising selection means for selecting an area, from the plurality of areas, from which to delete the machining program or binary data in response to a command from inside or outside of the numerical controller when the machining program or binary data is deleted.

5. The numerical controller according to claim 1, the numerical controller further comprising selection means for selecting an area, from among the plurality of areas, that includes the machining program or binary data to be operated in response to a command from inside or outside of the numerical controller when the machining program or binary data is operated.

6. The numerical controller according to claim 1, the numerical controller further comprising:
reserving means for reserving areas again in which a machining program or binary data larger in size than that of each of the divided areas is stored by combining the divided areas;
deciding means for deciding, when the machining program or binary data is transferred to and stored in the memory, whether a machining program or binary data has been stored in each of the areas reserved by combining the divided areas; and
writing means for writing the machining program or binary data to an area for which the deciding means decides that no machining program or binary data is stored.

7. The numerical controller according to claim 6, further comprising:
means for storing, when a machining program or binary data used to machine a single workpiece is too large to be stored in one of the areas combined by the reserving means, the machining program or binary program in two or more of the areas combined by the reserving means; and means for storing data, in the numerical controller, for linking a divided area to a next divided area.

8. The numerical controller according to claim 7, wherein the data for linking a divided area to a next divided area is designed to be combined with machine programs or binary data for machining a single workpiece, stored in two or more of the divided areas, for execution.

9. The numerical controller according to claim 6, further comprising selection means for selecting, from among the plurality of reserved areas, areas to be combined, in response to a command from inside or outside of the numerical controller.

10. The numerical controller according to claim 1, further comprising selection means for selecting the number of areas by which the other memory or non-volatile memory is divided and the size of each divided area, in response to a command from inside or outside of the numerical controller.

11. A numerical controller having an operation function that divides a non-volatile memory in the numerical controller into a plurality of memory areas, transfers a machining program stored in any one of the divided memory areas to another memory in the non-volatile memory, and stores the transferred machining program therein, the operation function being based on the machining program, the numerical controller comprising:
means for dividing an area in the non-volatile memory, to which a machining program is transferred and in which the transferred machining program is stored, into a plurality of areas in response to a command from a computer connected to the numerical controller or a process in the numerical controller;
means for further dividing at least one of the divided areas into a plurality of areas for storing machining programs which are smaller in size than that of the divided areas or larger in number than that of the divided areas;
deciding means for deciding, when the machining program is transferred to and stored in one of the divided areas, whether a machining program has been stored in each of the plurality of areas; and
writing means for writing the machining program to an area for which the deciding means decides that no machining program is stored.

12. The numerical controller according to claim 11, further comprising:
deciding means for deciding, when it is decided that a machining program or binary data is stored in each of the plurality of areas in a decision as to whether a machining program or binary data is stored in each of the plurality of areas, whether the machining program or binary data stored in the other memory or each of the plurality of areas in the non-volatile memory is being executed; and
writing means for deleting any of machining programs or binary data for which it is decided by the deciding means that the machining programs or binary data is not being executed, and writing a new machining program or new binary data to the area from which the machining program or binary data has been deleted.

13. The numerical controller according to claim 11, further comprising a selection means for selecting an area, from among the plurality of areas, in which the machining program or binary data should be stored in response to a command from inside or outside of the numerical controller when the machining program or binary data is stored.

14. The numerical controller according to 11, further comprising selection means for selecting an area, from the plurality of areas, from which to delete the machining program or binary data in response to a command from inside or outside of the numerical controller when the machining program or binary data is deleted.

15. The numerical controller according to claim 11, the numerical controller further comprising selection means for selecting an area, from among the plurality of areas, that includes the machining program or binary data to be operated in response to a command from inside or outside of the numerical controller when the machining program or binary data is operated.

16. The numerical controller according to claim 11, the numerical controller further comprising:
reserving means for reserving areas again in which a machining program or binary data larger in size than that of each of the divided areas is stored by combining the divided areas;
deciding means for deciding, when the machining program or binary data is transferred to and stored in the memory, whether a machining program or binary data has been stored in each of the areas reserved by combining the divided areas; and
writing means for writing the machining program or binary data to an area for which the deciding means decides that no machining program or binary data is stored.

17. The numerical controller according to claim 16, further comprising:
means for storing, when a machining program or binary data used to machine a single workpiece is too large to be stored in one of the areas combined by the reserving means, the machining program or binary program in two or more of the areas combined by the reserving means; and means for storing data, in the numerical controller, for linking a divided area to a next divided area.

18. The numerical controller according to claim 17, wherein the data for linking a divided area to a next divided area is designed to be combined with machine programs or binary data for machining a single workpiece, stored in two or more of the divided areas, for execution.

19. The numerical controller according to claim 16, further comprising selection means for selecting, from among the plurality of reserved areas, areas to be combined, in response to a command from inside or outside of the numerical controller.

20. The numerical controller according to claim 11, further comprising selection means for selecting the number of areas by which the other memory or non-volatile memory is divided and the size of each divided area, in response to a command from inside or outside of the numerical controller.

21. A numerical controller having an operation function that converts a machining program for binary data, created as a text file and stored in a storage unit in a computer connected to the numerical controller, an external storage unit connected to the numerical controller, or a non-volatile memory in the numerical controller, into binary data by performing analysis and preprocessing on the machine program while reading the machine program in succession, transfers the converted binary data to another memory other than the non-volatile memory in the numerical controller, stores the transferred binary data therein, and executes the stored binary data during an operation while reading the binary data in succession, the operation function being based on the binary data, the numerical controller comprising:

means for dividing the other memory into a plurality of memory areas in response to a command from the computer or a process in the numerical controller;
   means for further dividing at least one of the divided areas into a plurality of areas for storing binary data items which are smaller in size than that of the divided areas or larger in number than that of the divided areas;
   deciding means for deciding, when the binary data is transferred to and stored in the other memory, whether a machining program has been stored in each of the plurality of areas; and
   writing means for writing the binary data to an area for which the deciding means decides that no machining program is stored.

22. The numerical controller according to claim 21, further comprising:

deciding means for deciding, when it is decided that a machining program or binary data is stored in each of the plurality of areas in a decision as to whether a machining program or binary data is stored in each of the plurality of areas, whether the machining program or binary data stored in the other memory or each of the plurality of areas in the non-volatile memory is being executed; and
   writing means for deleting any of machining programs or binary data for which it is decided by the deciding means that the machining programs or binary data is not being executed, and writing a new machining program or new binary data to the area from which the machining program or binary data has been deleted.

23. The numerical controller according to claim 21, further comprising a selection means for selecting an area, from among the plurality of areas, in which the machining program or binary data should be stored in response to a command from inside or outside of the numerical controller when the machining program or binary data is stored.

24. The numerical controller according to claim 21, further comprising selection means for selecting an area, from the plurality of areas, from which to delete the machining program or binary data in response to a command from inside or outside of the numerical controller when the machining program or binary data is deleted.

25. The numerical controller according to claim 21, the numerical controller further comprising selection means for selecting an area, from among the plurality of areas, that includes the machining program or binary data to be operated in response to a command from inside or outside of the numerical controller when the machining program or binary data is operated.

26. The numerical controller according to claim 21, the numerical controller further comprising:

reserving means for reserving areas again in which a machining program or binary data larger in size than that of each of the divided areas is stored by combining the divided areas;
   deciding means for deciding, when the machining program or binary data is transferred to and stored in the memory, whether a machining program or binary data has been stored in each of the areas reserved by combining the divided areas; and
   writing means for writing the machining program or binary data to an area for which the deciding means decides that no machining program or binary data is stored.

27. The numerical controller according to claim 26, further comprising:

means for storing, when a machining program or binary data used to machine a single workpiece is too large to be stored in one of the areas combined by the reserving means, the machining program or binary program in two or more of the areas combined by the reserving means;
   and means for storing data, in the numerical controller, for linking a divided area to a next divided area.

28. The numerical controller according to claim 27, wherein the data for linking a divided area to a next divided area is designed to be combined with machine programs or binary data for machining a single workpiece, stored in two or more of the divided areas, for execution.

29. The numerical controller according to claim 26, further comprising selection means for selecting, from among the plurality of reserved areas, areas to be combined, in response to a command from inside or outside of the numerical controller.

30. The numerical controller according to claim 21, further comprising selection means for selecting the number of areas by which the other memory or non-volatile memory is divided and the size of each divided area, in response to a command from inside or outside of the numerical controller.

31. A numerical controller having an operation function that divides a non-volatile memory in the numerical controller into a plurality of memory areas, converts a machining program for binary data, stored in any one of the divided memory areas, into binary data by performing analysis and preprocessing on the machine program while reading the machine program in succession, transfers the binary data to another memory area in the non-volatile memory in the numerical controller, stores the transferred binary data therein, and executes the stored binary data during an operation while reading the binary data in succession, the operation function being based on the binary data, the numerical controller comprising:

means for dividing an area, to which the binary data in the non-volatile memory is transferred and in which the transferred binary data is stored, into a plurality of areas in response to a command from a computer connected to the numerical controller or a process in the numerical controller;
   means for further dividing at least one of the divided areas into a plurality of areas for storing binary data items which are smaller in size than that of the divided areas or larger in number than that of the divided areas;
   deciding means for deciding, when the binary data is transferred to and stored in one of the divided areas, whether binary data has been stored in each of the plurality of areas; and writing means for writing the binary data to an area for which the deciding means decides that no binary data is stored.

32. The numerical controller according to claim 31, further comprising:
deciding means for deciding, when it is decided that a machining program or binary data is stored in each of the plurality of areas in a decision as to whether a machining program or binary data is stored in each of the plurality of areas, whether the machining program or binary data stored in the other memory or each of the plurality of areas in the non-volatile memory is being executed; and
writing means for deleting any of machining programs or binary data for which it is decided by the deciding means that the machining programs or binary data is not being executed, and writing a new machining program or new binary data to the area from which the machining program or binary data has been deleted.

33. The numerical controller according to claim 31, further comprising a selection means for selecting an area, from among the plurality of areas, in which the machining program or binary data should be stored in response to a command from inside or outside of the numerical controller when the machining program or binary data is stored.

34. The numerical controller according to claim 31, further comprising selection means for selecting an area, from the plurality of areas, from which to delete the machining program or binary data in response to a command from inside or outside of the numerical controller when the machining program or binary data is deleted.

35. The numerical controller according to claim 31, the numerical controller further comprising selection means for selecting an area, from among the plurality of areas, that includes the machining program or binary data to be operated in response to a command from inside or outside of the numerical controller when the machining program or binary data is operated.

36. The numerical controller according to claim 31, the numerical controller further comprising:
reserving means for reserving areas again in which a machining program or binary data larger in size than that of each of the divided areas is stored by combining the divided areas;
deciding means for deciding, when the machining program or binary data is transferred to and stored in the memory, whether a machining program or binary data has been stored in each of the areas reserved by combining the divided areas; and
writing means for writing the machining program or binary data to an area for which the deciding means decides that no machining program or binary data is stored.

37. The numerical controller according to claim 36, further comprising:
means for storing, when a machining program or binary data used to machine a single workpiece is too large to be stored in one of the areas combined by the reserving means, the machining program or binary program in two or more of the areas combined by the reserving means; and means for storing data, in the numerical controller, for linking a divided area to a next divided area.

38. The numerical controller according to claim 37, wherein the data for linking a divided area to a next divided area is designed to be combined with machine programs or binary data for machining a single workpiece, stored in two or more of the divided areas, for execution.

39. The numerical controller according to claim 36, further comprising selection means for selecting, from among the plurality of reserved areas, areas to be combined, in response to a command from inside or outside of the numerical controller.

40. The numerical controller according to claim 31, further comprising selection means for selecting the number of areas by which the other memory or non-volatile memory is divided and the size of each divided area, in response to a command from inside or outside of the numerical controller.

* * * * *